United States Patent
Nagabhushanrao et al.

(10) Patent No.: US 11,387,670 B2
(45) Date of Patent: Jul. 12, 2022

(54) DOUBLE CONVERSION ON LINE UPS WITH PASS THROUGH NEUTRAL EMPLOYING SINGLE DC BUS

(71) Applicant: SCHNEIDER ELECTRIC IT CORPORATION, Foxboro, MA (US)

(72) Inventors: Pradeep Tolakanahalli Nagabhushanrao, Bangalore (IN); Chandrasekaran Jayaraman, Bangalore (IN); Anil Cheniveettil Suresh, Kerala (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/162,343

(22) Filed: Jan. 29, 2021

(65) Prior Publication Data

US 2021/0249899 A1    Aug. 12, 2021

(30) Foreign Application Priority Data

Jan. 31, 2020 (IN) .............................. 202011004301

(51) Int. Cl.
*H02J 9/06* (2006.01)
*H02M 7/217* (2006.01)
(Continued)

(52) U.S. Cl.
CPC .............. *H02J 9/062* (2013.01); *H02M 7/217* (2013.01); *H02M 7/53871* (2013.01); *H02M 1/4208* (2013.01)

(58) Field of Classification Search
CPC .......... H02J 9/062; H02J 9/063; H02M 7/217; H02M 7/53871; H02M 1/4208;
(Continued)

(56) References Cited

U.S. PATENT DOCUMENTS

2020/0280265 A1* 9/2020 Nishimura ........... H02H 7/1216
2020/0295595 A1* 9/2020 Shigeta .................. H02J 9/062

* cited by examiner

*Primary Examiner* — Toan T Vu
(74) *Attorney, Agent, or Firm* — Lando & Anastasi, LLP (57) ABSTRACT

An Uninterruptible Power Supply (UPS) system, the UPS system comprising an input configured to receive input AC power having an input voltage level and an input frequency, an output configured to provide output AC power to a load, the output power having an output voltage level and an output frequency, a converter coupled to the input and configured to convert the input AC power into DC power, an inverter coupled to the output and configured to convert the DC power into the output AC power and provide the output AC power to the output, a DC bus coupled between the converter and the inverter including a first capacitive element and a second capacitive element, the first capacitive element being coupled to a first output and a second output of the converter and the second capacitive element being coupled to a first input and a second input of the inverter, a de-coupler circuit coupled between the first and second capacitive elements and configured to selectively decouple the inverter from the converter, and a controller configured to operate the converter, the inverter, and the de-coupler circuit in a first mode of operation such that the output voltage level and output frequency of the output AC power are the same as the input voltage level and input frequency of the input AC power and a second mode of operation such that at least one of the output voltage level or output frequency of the output AC power differs from the input voltage level and input frequency of the input AC power.

28 Claims, 8 Drawing Sheets

(51) Int. Cl.
*H02M 7/5387* (2007.01)
*H02M 1/42* (2007.01)

(58) Field of Classification Search
CPC .... H02M 1/0048; H02M 5/4585; H02M 1/14; Y02B 70/10
See application file for complete search history.

DOUBLE CONVERSION ON LINE UPS WITH PASS THROUGH NEUTRAL EMPLOYING SINGLE DC BUS

CROSS-REFERENCE TO RELATED APPLICATION

This application claims the benefit under 35 U.S.C. § 119 of Indian Patent Application No. 202011004301 filed on Jan. 31, 2020 which is hereby incorporated herein by reference in its entirety for all purposes.

BACKGROUND

1. Field of Invention

Embodiments of this disclosure relate generally to power conversion, and more particularly, to AC-DC power conversion in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security data center management systems may also provide backup power for loads of between 1 and 20 kVA for several hours.

SUMMARY

At least one aspect of the present disclosure is directed to an Uninterruptible Power Supply (UPS) system including an input configured to receive input AC power having an input voltage level and an input frequency, an output configured to provide output AC power to a load, the output power having an output voltage level and an output frequency, a converter coupled to the input and configured to convert the input AC power into DC power, an inverter coupled to the output and configured to convert the DC power into the output AC power and provide the output AC power to the output, a DC bus coupled between the converter and the inverter including a first capacitive element and a second capacitive element, the first capacitive element being coupled to a first output and a second output of the converter and the second capacitive element being coupled to a first input and a second input of the inverter, a de-coupler circuit coupled between the first and second capacitive elements and configured to selectively decouple the inverter from the converter, and a controller configured to operate the converter, the inverter, and the de-coupler circuit in a first mode of operation such that the output voltage level and output frequency of the output AC power are the same as the input voltage level and input frequency of the input AC power and a second mode of operation such that at least one of the output voltage level or output frequency of the output AC power differs from the input voltage level and input frequency of the input AC power.

In one embodiment, the controller is configured to operate the UPS system in the first mode of operation by controlling the de-coupler circuit to couple the inverter to the converter. In some embodiments, the controller is configured to operate the UPS system in the second mode of operation by controlling the de-coupler circuit to selectively decouple the inverter from the converter based on an operational state of the converter. In various embodiments, the controller is configured to operate the UPS system in a third mode of operation by alternating the UPS system between the first and second modes of operation.

In some embodiments, the controller is configured, during the third mode of operation, to operate the UPS system in the first mode of operation in response to a determination that an input voltage of the input AC power and an output voltage of the output AC power are both positive or both negative. In certain embodiments, the controller is configured, during the third mode of operation, to operate the UPS system in the second mode of operation in response to a determination that one of the input voltage or the output voltage is positive and the other is negative. In various embodiments, the output voltage level and output frequency are independently controllable with respect to the input voltage level and input frequency during the third mode of operation.

In some embodiments, the converter includes a first converter switch, a second converter switch, and a first inductive element, the first inductive element being coupled at a first end to the input. In one embodiment, the first inductive element is coupled at a second end to the first converter switch and the second converter switch is coupled in series with the first conductive switch. In another embodiment, the first inductive element is coupled at a second end to the first converter switch and the second converter switch. In one embodiment, the controller is configured to operate the converter in a first state by controlling the first and second switches to energize the first inductive element. In various embodiments, the controller is configured to operate the converter in a second state by controlling the first and second converter switches to de-energize the first inductive element to charge the first capacitive element.

In one embodiment, the de-coupler circuit includes a first de-coupler switch coupled at a first end to the first output of the converter, a second de-coupler switch coupled at a first end to the second output of the converter, a second inductive element coupled between the first input of the inverter and a second end of the first de-coupler switch, and a third inductive element coupled between the second input of the inverter and a second end of the second de-coupler switch. In some embodiments, the controller is configured to control the first and second de-coupler switches to couple the inputs of the inverter to the outputs of the converter during the first mode of operation. In various embodiments, the controller is configured to control the first and second de-coupler switches to couple the inputs of the inverter to the outputs of the converter while operating the converter in the first state during the second mode of operation. In certain embodiments, the first conductive element is discharged to charge the second conductive element while the controller is operating the converter in the first state during the second mode of operation. In some embodiments, the controller is configured to control the first and second de-coupler switches to decouple the inputs of the inverter from the outputs of the converter while operating the converter in the second state during the second mode of operation. In one embodiment, the second conductive element is discharged to provide DC power to the inverter while the controller is operating the converter in the second state during the second mode of operation. In various embodiments, the input, the converter, the inverter, and the output are coupled to a common neutral line.

Another aspect of the present disclosure is directed to a non-transitory computer readable medium storing thereon sequences of computer-executable instructions for operating an Uninterruptible Power Supply (UPS) system. The sequences of computer-executable instructions including instructions that instruct at least one processor to operate the UPS system to receive input AC power having an input voltage level and an input frequency at an input of the UPS system, operate a converter to convert the input AC power into DC power, operate an inverter to convert the DC power into output AC power and provide the output AC power to an output of the UPS system, the output AC power having an output voltage level and an output frequency, couple, via a de-coupler circuit, the inverter to the converter during a first mode of operation such that the output voltage level and output frequency of the output AC power are the same as the input voltage level and input frequency of the input AC power, and selectively de-couple, via the de-coupler circuit, the inverter from the converter during a second mode of operation such that at least one of the output voltage level or output frequency of the output AC power differs from the input voltage level and input frequency of the input AC power.

In one embodiment, the sequences of instructions include instructions that cause the at least one processor to operate the UPS to operate the converter by alternating the converter between a first state and a second state to convert the input AC power into DC power. In some embodiments, the sequences of instructions include instructions that cause the at least one processor to operate the UPS system to operate the converter to energize an inductive element coupled to the input of the converter during the first state and de-energize the inductive element to charge a first capacitive element coupled to a first and second output of the converter during the second state. In certain embodiments, the sequences of instructions include instructions that cause the at least one processor to operate the UPS system to operate the converter in the first state to discharge the first capacitive element to charge a second capacitive element coupled to a first and second input of the inverter during the second mode of operation. In various embodiments, the sequences of instructions include instructions that cause the at least one processor to operate the UPS system to operate the converter in the second state to discharge the second capacitive element to provide DC power to the inverter during the second mode of operation.

In one embodiment, the sequences of instructions include instructions that cause the at least one processor to operate the UPS system to selectively de-couple the inverter from the converter during the second mode of operation while the converter is operating in the second state. In some embodiments, the sequences of instructions include instructions that cause the at least one processor to operate the UPS system to operate the UPS system in a third mode of operation by operating the UPS system in the first mode of operation in response to a determination that an input voltage of the input AC power and an output voltage of the output AC power are both positive or both negative and in the second mode of operation in response to a determination that one of the input voltage or the output voltage is positive and the other is negative. In various embodiments, the output voltage level and output frequency of the output AC power are independently controllable with respect to the input voltage level and input frequency of the input AC power during the third mode of operation.

Another aspect of the present disclosure is directed to a method for operating an Uninterruptible Power Supply (UPS) system. The method includes receiving input AC power having an input voltage level and an input frequency at an input of the UPS system, operating the converter to convert the input AC power into DC power, operating the inverter to convert the DC power into output AC power and provide the output AC power to an output of the UPS system, the output AC power having an output voltage level and an output frequency, coupling, via a de-coupler circuit, the inverter to the converter during a first mode of operation such that the output voltage level and output frequency of the output AC power are the same as the input voltage level and input frequency of the input AC power, and selectively de-coupling, via the de-coupler circuit, the inverter from the converter during a second mode of operation such that at least one of the output voltage level or output frequency of the output AC power differs from the input voltage level and input frequency of the input AC power.

In one embodiment, operating the converter further includes alternating the converter between a first state and a second state to convert the input AC power into DC power. In some embodiments, operating the converter further includes energizing an inductive element coupled to the input of the converter during the first state and de-energizing the inductive element to charge a first capacitive element coupled to a first and second output of the converter during the second state. In certain embodiments, operating the converter in the first state further includes discharging the first capacitive element to charge a second capacitive element coupled to a first and second input of the inverter during the second mode of operation. In various embodiments, operating the converter in the second state further includes discharging the second capacitive element to provide DC power to the inverter during the second mode of operation.

In one embodiment, selectively de-coupling the inverter from the converter during the second mode of operation further includes de-coupling the inverter from the converter while the converter is operating in the second state. In some embodiments, the method includes operating the UPS system in a third mode of operation by operating the UPS system in the first mode of operation in response to a determination that an input voltage of the input AC power and an output voltage of the output AC power are both positive or both negative and in the second mode of operation in response to a determination that one of the input voltage or the output voltage is positive and the other is negative. In various embodiments, the output voltage level and output frequency of the output AC power are independently controllable with respect to the input voltage level and input frequency of the input AC power during the third mode of operation.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), may be used to provide regulated, uninterrupted power to sensitive and/or critical loads. An online UPS rectifies input AC power provided by an electric utility using a Power Factor Correction converter circuit (PFC) to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

In many cases, it may be desirable for the output AC power of an online UPS to have a voltage level and/or frequency independent of the input AC power of the online UPS. As such, many online UPS topologies employ a split DC bus and a pass-through neutral connection between the input and the output. During the online mode of operation, the split DC bus may be energized using dual PFC converters. Such online UPS topologies often include separate DC capacitor banks (e.g., coupled between the split DC bus and the pass-through neutral connection) to achieve asynchronous operation of the inverter. While such topologies can be utilized to provide voltage and/or frequency independence between the input and the output, the split DC bus configuration can present several drawbacks. For example, the split DC bus may require the use of high-voltage switches in the inverter, reducing efficiency. In addition, the use of extra components (e.g., separate DC capacitor banks, dual PFC converters) can increase the size and cost of the UPS, and in some cases, may limit performance.

A more efficient and compact online UPS topology is provided herein. In at least one embodiment, the topology includes a de-coupler circuit coupled between the converter and the inverter in a single DC bus configuration. In one example, by operating the de-coupler circuit to selectively de-couple the inverter from the converter, the inverter can efficiently provide output AC power having the same voltage level and frequency as the input AC power and output AC power having a voltage level and/or frequency independent of the input AC power.

Figure 1:
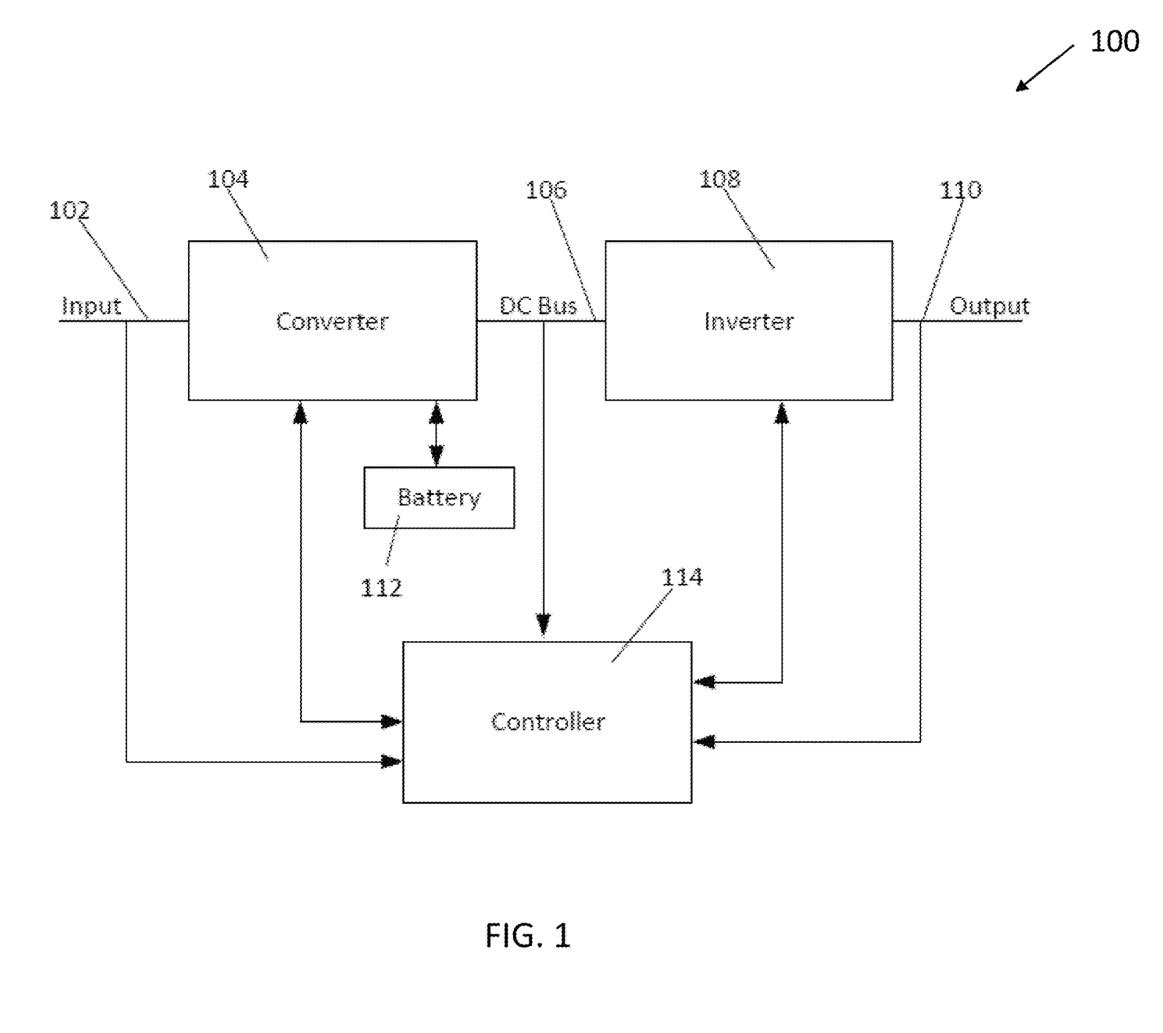
FIG. 1 is a functional block diagram of a UPS in accordance with one embodiment described herein.

FIG. 1 is a block diagram of one embodiment of an online UPS 100 that provides regulated power from input AC power received at an input 102, as well as back-up power from a battery 112, to an output 110. The UPS 100 includes a converter 104, a DC bus 106, an inverter 108, and a controller 114 for controlling the converter and the inverter. The converter 104 is coupled to the input 102, the inverter 108 is coupled to the output 110, and the DC bus 106 is coupled between the converter 104 and the inverter 108.

The input 102 is configured to receive input AC power having an input voltage level from an AC power source. The controller 114 monitors the input AC power received by the input 102 and is configured to operate the UPS 100 in different modes of operation based on the status of the input AC power received by the input 102. When AC power provided to the input 102 is acceptable (i.e., above an input power threshold), the controller 114 operates the UPS 100 in an online mode of operation.

In the online mode of operation, AC power from the input 102 can be provided to the converter 104. According to one embodiment, the converter 104 is a Power Factor Correction (PFC) converter 104; however, in other embodiments, other types of converters may be utilized. The controller 114 operates the converter 104 to convert the AC power into DC power and provide the DC power to the DC bus 106. DC power from the DC bus 106 is provided to the inverter 108. In addition, DC power from the DC bus 106 may be provided to the battery 112 for charging, either directly from the converter 104 or via a DC/DC converter. The controller 114 operates the inverter 108 to convert the DC power into regulated AC power and provide the regulated AC power to a load coupled to the output 110.

When AC power provided to the input 102 is not acceptable (i.e., below an input power threshold), the controller 114 operates the UPS 100 in a backup mode of operation. In the backup mode of operation, DC power from the battery 112 is provided to the DC bus 106, either directly or via a DC/DC converter. The inverter 108 receives the DC power from the DC bus 106, and the controller 114 operates the inverter 108 to convert the DC power from the DC bus 106 into regulated AC power and provide the regulated AC power to the output 110.

In many cases, it may be desirable for the output AC power of an online UPS to have a voltage level and/or frequency independent of the input AC power of the online UPS. As such, many online UPS topologies employ a split DC bus and a pass-through neutral connection between the input and the output. During the online mode of operation, the split DC bus may be energized using dual PFC converters. Such online UPS topologies often include separate DC capacitor banks (e.g., coupled between the split DC bus and the pass-through neutral connection) to achieve asynchronous operation of the inverter. While such topologies can be utilized to provide voltage and/or frequency independence between the input and the output, the split DC bus configuration can present several drawbacks. For example, the split DC bus may require the use of high-voltage switches in the inverter, reducing efficiency. In addition, the use of extra components (e.g., separate DC capacitor banks, dual PFC converters) can increase the size and cost of the UPS, and in some cases, may limit performance.

Figure 2A:
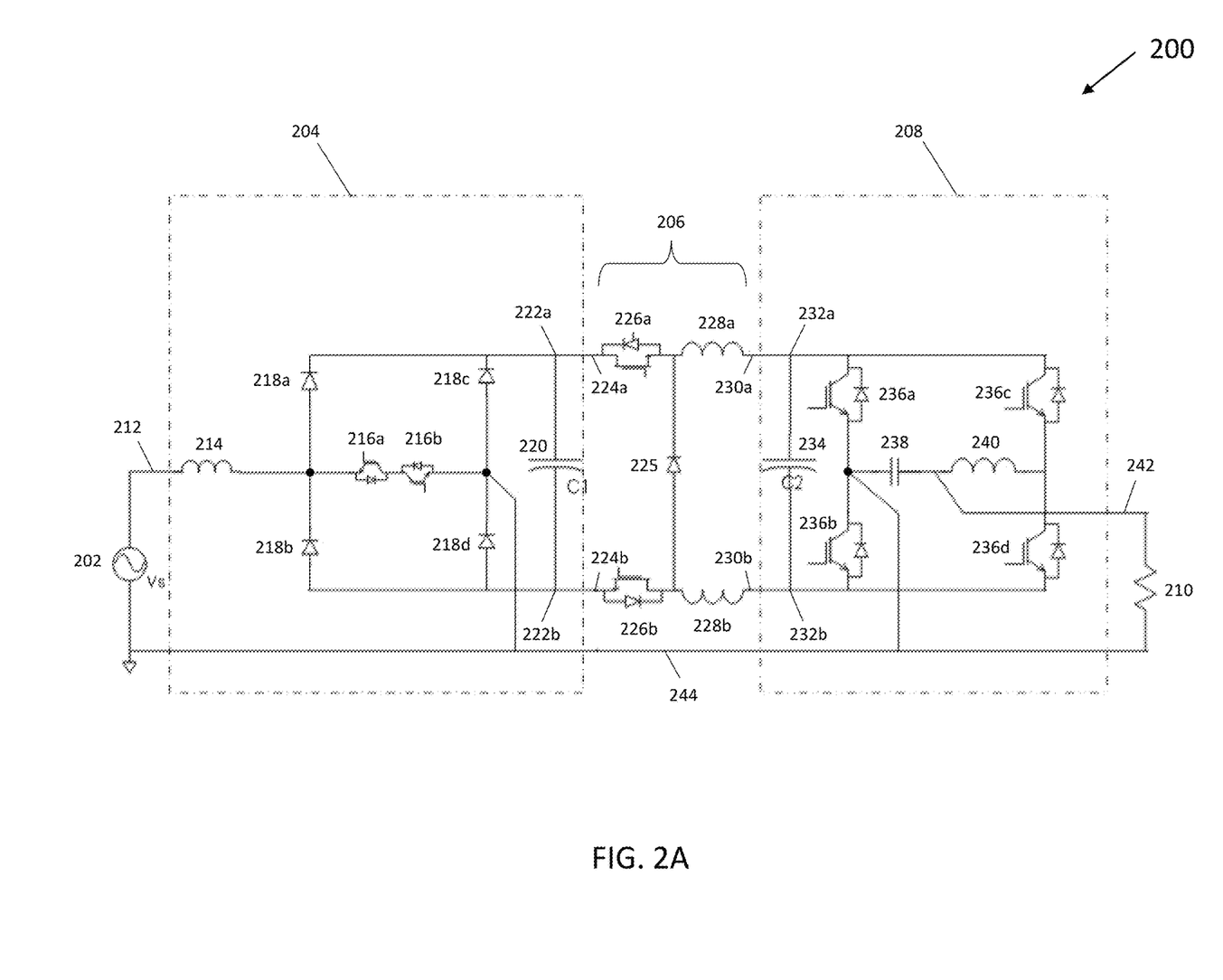
FIG. 2A is a schematic diagram of a UPS topology in accordance with one embodiment described herein.

FIG. 2A is a schematic diagram of a UPS topology 200 according to aspects described herein. In one example, the UPS topology 200 may correspond to the UPS 100 of FIG. 1. The UPS topology 200 includes a converter 204, a de-coupler circuit 206, and an inverter 208. As shown, the converter 204 is coupled to an AC source 202 via an input 212. A first output 222a of the converter 204 is coupled to a first input 224a of the de-coupler circuit 206. Likewise, a second output 222b of the converter 204 is coupled to a second input 224b of the de-coupler circuit 206. Similarly, a first output 230a of the de-coupler circuit 206 is coupled to a first input 232a of the inverter 208 and a second output 230b of the de-coupler circuit 206 is coupled to a second input 232b of the inverter 208. An output 242 of the inverter 208 is coupled to a load 210. As shown, a pass-through neutral connection 244 may be coupled to the AC source 202, the converter 204, the inverter 208, and the load 210.

In at least one example, the converter 204 includes a first inductor 214, a first converter switch 216a, a second converter switch 216b, a first diode 218a, a second diode 218b, a third diode 218c, a fourth diode 218d, and a first capacitor 220. In one embodiment, the first and second converter switches 216a, 216b are Insulated-Gate Bipolar Transistors (IGBT); however, in other embodiments, different types of switches or transistors can be utilized. In some examples, each of the converter switches 216a, 216b has a gate, a collector, and an emitter. In this context, "collector" may refer to any device terminal at which current enters the switch. Likewise, "emitter" may refer to any device terminal at which current exits the switch. In at least one embodiment where the switches are IGBTs, each switch includes a built-in body diode coupled between the emitter and collector. As shown, the collector of the first converter switch 216a is coupled to the collector of the second converter switch 216b. A first end of the first inductor 214 is coupled to the input 212 of the converter 204 and a second end of the first inductor 214 is coupled to the emitter of the first converter switch 216a, the first diode 218a, and the second diode 218b. The emitter of the second converter switch 216b is coupled to the third diode 218c, the fourth diode 218d, and the neutral connection 244. A first end of the capacitor 220 is coupled to the first output 222a of the converter 204 and a second end of the capacitor 220 is coupled to the second output 222b of the converter 204.

In at least one embodiment, the de-coupler circuit 206 includes a first de-coupler switch 226a, a second de-coupler switch 226b, a freewheeling diode 225, a second inductor 228a, and a third inductor 228b. In one embodiment, the first and second de-coupler switches 226a, 226b are Metal-Oxide-Semiconductor Field-Effect Transistors (MOSFET); however, in other embodiments, different types of switches or transistors can be utilized. In some examples, each of the de-coupler switches 226a, 226b has a gate, a drain, and a source. In this context, "drain" may refer to any device terminal at which current enters the switch. Likewise, "source" may refer to any device terminal at which current exits the switch. As shown, the drain of the first de-coupler switch 226a is coupled to the first input 224a of the de-coupler circuit 206 and the source of the first de-coupler switch 226a is coupled to the freewheeling diode 225 and a first end of the third inductor 228a. Likewise, the source of the second de-coupler switch 226b is coupled to the second input 224b of the de-coupler circuit 206 and the drain of the second de-coupler switch 226b is coupled to the freewheeling diode 225 and a first end of the fourth inductor 228b. A second end of the third inductor 228a is coupled to the first output 230a of the de-coupler circuit 206 and a second end of the fourth inductor 228b is coupled to the second output 230b of the de-coupler circuit 206.

In at least one embodiment, the inverter 208 includes a second capacitor 234, a first inverter switch 236a, a second inverter switch 236b, a third inverter switch 236c, a fourth inverter switch 236d, a third capacitor 238, and a fourth inductor 240. Similar to the converter switches 216a, 216b, in one embodiment the inverter switches 236a-236d may be IGBTs; however, in other embodiments, different types of switches or transistors can be utilized (e.g., MOSFETs). As shown, a first end of the second capacitor 234 is coupled to the first input 232a of the inverter 208 and a second end of the second capacitor 234 is coupled to the second input 232b of the inverter 208. The collector of the first inverter switch 236a is coupled to the first input 232a of the inverter 208 and the emitter of the first inverter switch 236a is coupled to the collector of the second inverter switch 236b, a first end of the third capacitor 238, and the neutral connection 244. The collector of the third inverter switch 236c is coupled to the first input 232a of the inverter 208 and the emitter of the third inverter switch 236c is coupled to the collector of the fourth inverter switch 236d and a first end of the fourth inductor 240. The emitter of the second inverter switch 236b and the emitter of the fourth inverter switch 236d are coupled to the second input 232b of the inverter 208. A second end of the third capacitor 238 is coupled to a second end of the fourth inductor 240 and the output 242 of the inverter 208.

In at least one example, the UPS topology 200 can be operated in various modes of operation. For example, in a synchronous mode of operation, the first and second de-coupler switches 226a, 226b are turned on (i.e., closed) to couple the first and second inputs 232a, 232b of the inverter 208 to the first and second outputs 222a, 222b of the converter 204. Also in the synchronous mode of operation, the converter 204 is operated to convert input AC power provided by the AC source 202 into DC power, the de-coupler circuit 206 functions as a single DC bus, and the first and second capacitors 220, 234 function as DC bus capacitors to store the DC power provided by the converter 204. Further in the synchronous mode of operation, the inverter 208 is operated to convert the DC power into output AC power having the same voltage level and frequency as the input power provided by the AC source 202.

In addition, the UPS topology 200 can also be operated in an asynchronous mode of operation. In the asynchronous mode of operation, the first and second de-coupler switches 226a, 226b are controlled in unison with the first and second converter switches 216a, 216b such that at least one of the voltage level and/or frequency of the output AC power differs from the input AC power provided by the AC source 202.

Figure 2B:
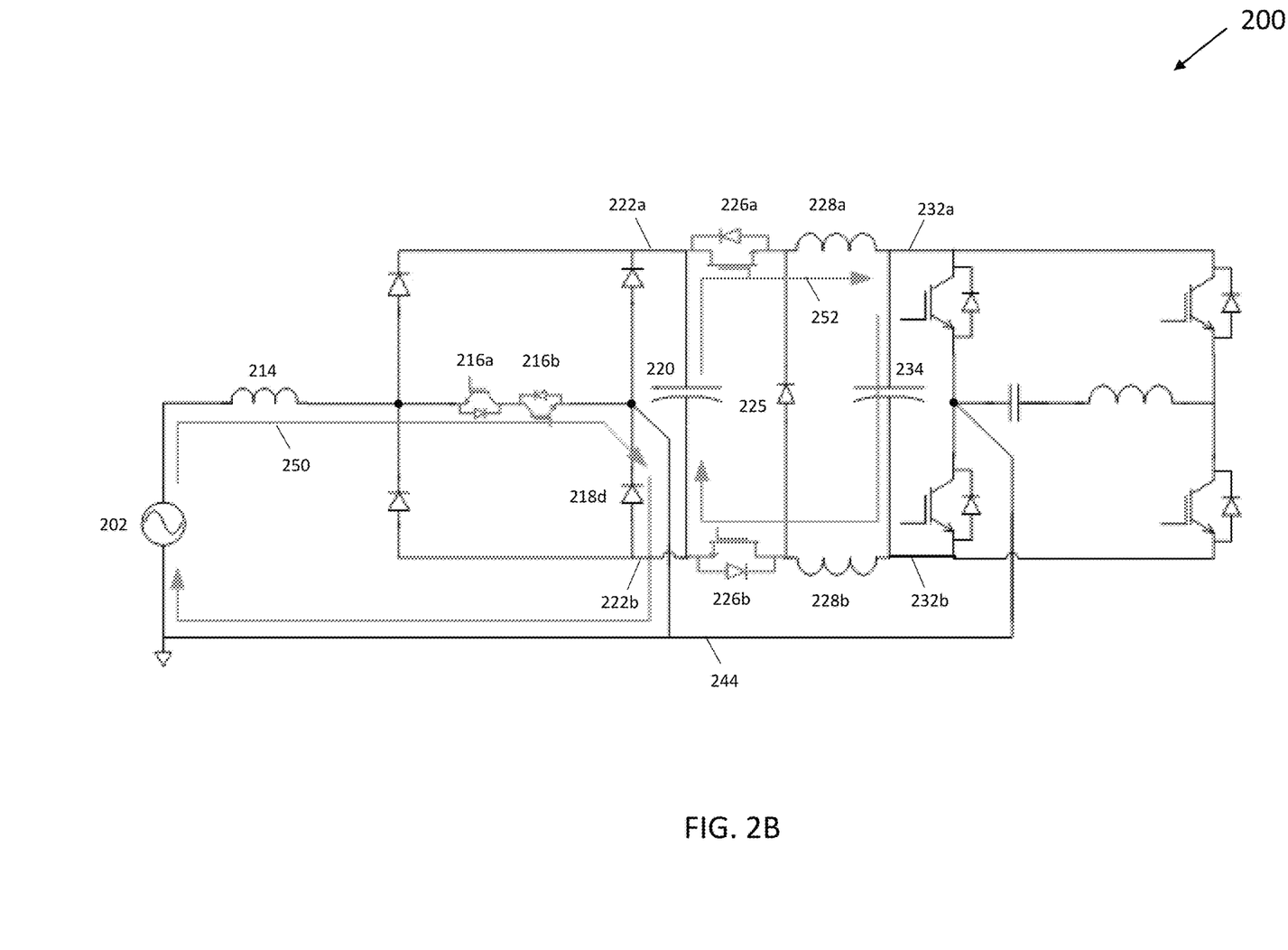
FIG. 2B is a schematic diagram of a UPS topology in accordance with one embodiment described herein.
Figure 2C:
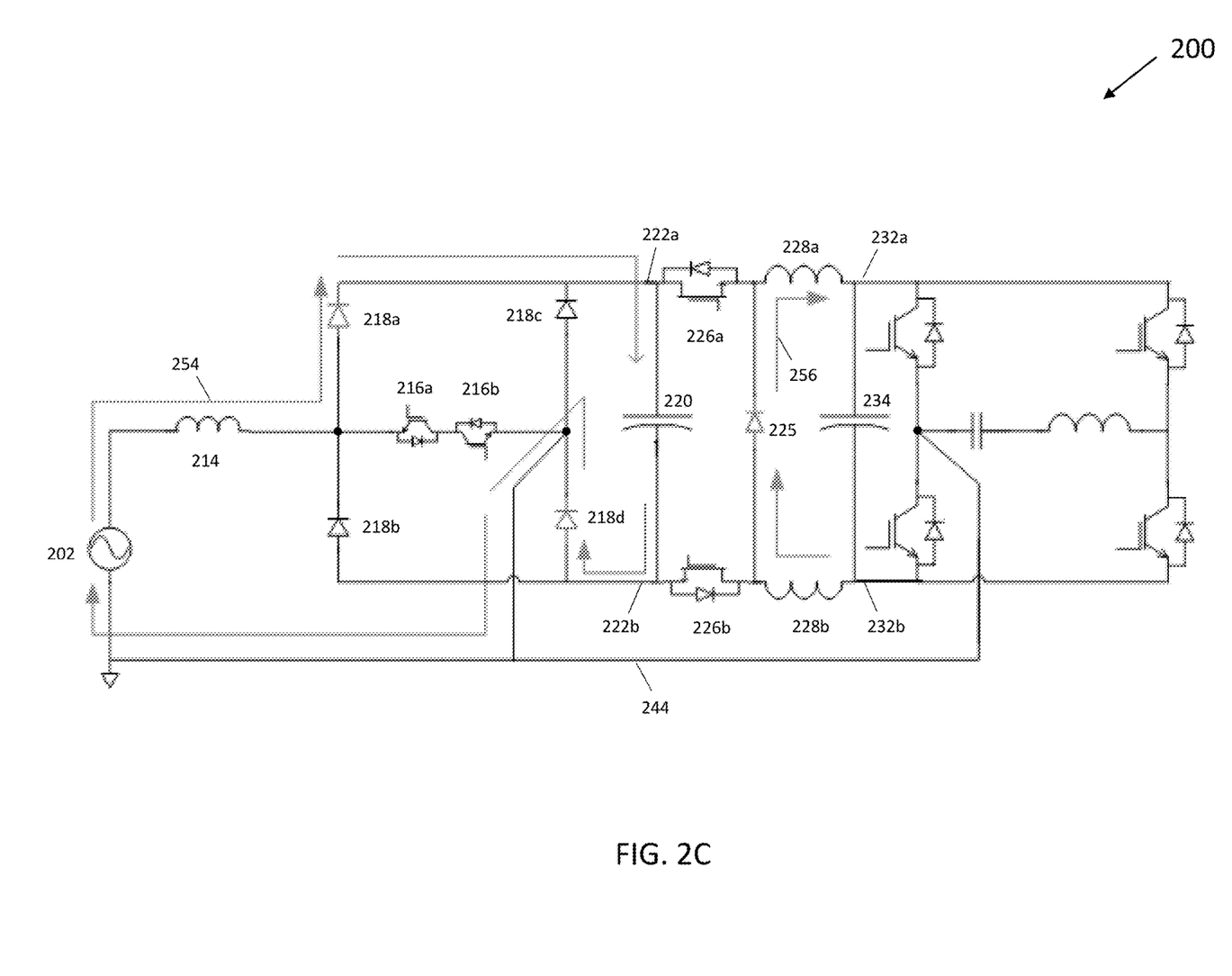
FIG. 2C is a schematic diagram of a UPS topology in accordance with one embodiment described herein.

FIGS. 2B and 2C are schematic diagrams illustrating the asynchronous mode of operation during a positive half-cycle of the input AC voltage corresponding to the input AC power.

As shown in FIG. 2B, during a first state of the asynchronous mode of operation, the first and second converter switches 216a, 216b are turned on (i.e., closed) to couple the second end of the first inductor 214 to the neutral connection 244. As such, a first conduction path 250 for the input AC power is provided through the first and second converter switches 216a, 216b to the neutral connection 244, energizing the first inductor 214. In one example, the first conduction path 250 may include at least one body diode of the converter switches 216a, 216b. Simultaneously, the first and second de-coupler switches 226a, 226b are turned on (i.e., closed) to couple the first and second inputs 232a, 232b of the inverter 208 to the first and second outputs 222a, 222b of the converter 204. As such, the first capacitor 220 discharges via a second conduction path 252 including the second and third inductors 228a, 228b to charge the second capacitor 234 and to provide DC power to the inverter 208.

In a second state of the asynchronous mode of operation, the first and second converter switches 216a, 216b are turned off (i.e., opened) to de-couple the first inductor 214 from the neutral connection 244. As shown in FIG. 2C, when the first and second converter switches 216a, 216b are turned off, a third conduction path 254 is provided from the first inductor 214 through the first diode 218a, the first capacitor 220, and the fourth diode 218d to the neutral connection 244. In one example, the first inductor 214 is de-energized to charge the first capacitor 220 via the third conduction path 254. Simultaneously, the first and second de-coupler switches 226a, 226b are turned off (i.e., opened) to de-couple the first and second inputs 232a, 232b of the inverter 208 from the first and second outputs 222a, 222b of the converter 204. As such, the second capacitor 234 discharges via a fourth conduction path 256 through the freewheeling diode 225 and the third and fourth inductors 228a, 228b to provide DC power to the inverter 208.

While not shown, in the asynchronous mode of operation, the UPS topology 200 can be configured to operate similarly during a negative half cycle of the input AC power. For example, when the switches 216a, 216b, 226a, and 226b are turned on (i.e., closed), the first inductor 214 is energized (e.g., via the first conduction path 250), and the first capacitor 220 discharges (e.g., via the second conduction path 252) to charge the second capacitor 234 and to provide DC power to the inverter 208. Likewise, when the switches 216a, 216b, 226a, and 226b are turned off (i.e., opened), the first inductor 214 is de-energized to charge the first capacitor 220 via a conduction path including the second and third diodes 218b, 218c, and the second capacitor 234 discharges (e.g., via the fourth conduction path 256) to provide DC power to the inverter 208.

Being that the first and second converter switches 216a, 216b and the first and second de-coupler switches 226a, 226b are controlled in unison, the inverter 208 may be isolated from the AC source 202 and the operation of the converter 204. For example, when the switches 216a, 216b, 226a, and 226b are turned on (i.e., closed), the AC source 202 is effectively shorted to neutral (i.e., ground) through the first inductor 214 and the inverter 208 is operated to convert DC power provided from the first capacitor 220. Likewise, when the switches 216a, 216b, 226a, and 226b are turned off (i.e., opened), the inverter 208 is de-coupled from the converter 204 and is operated to convert DC power provided by the second capacitor 234. As such, the inverter 208 may be operated independently relative to operation of the converter 204 to provide output AC power having a voltage level and/or frequency which differs from the input AC power provided by the AC source 202.

Figure 3A:
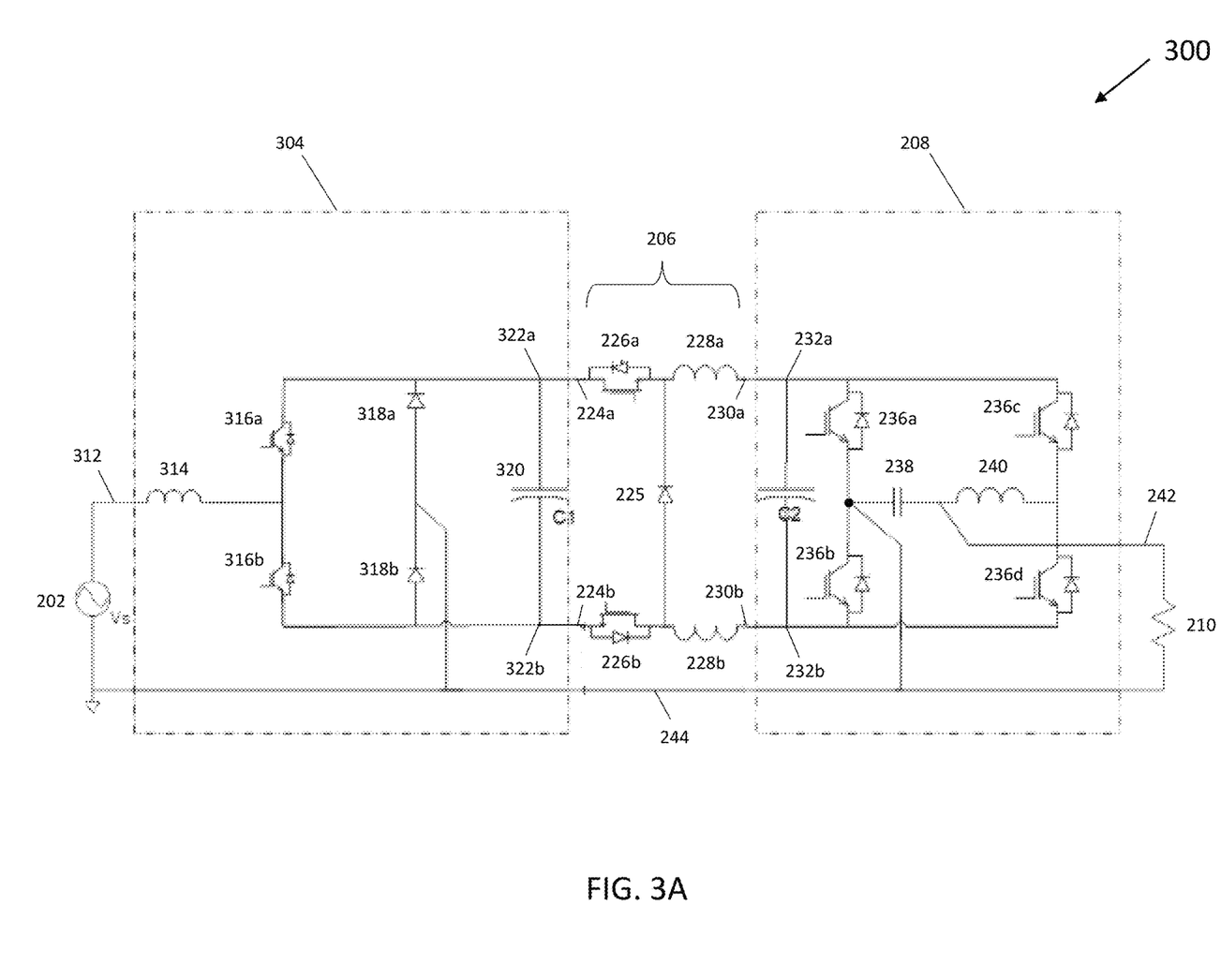
FIG. 3A is a schematic diagram of a UPS topology in accordance with one embodiment described herein.

It should be appreciated that embodiments described herein are not limited to specific configurations of power conversion circuitry (e.g., PFC converter topologies). For example, FIG. 3A is a schematic diagram of a UPS topology 300 according to aspects described herein. In some examples, the UPS topology 300 may be substantially the same as the UPS topology 200 of FIGS. 2A-2C, except the UPS topology 300 includes a converter 304 configured differently than the converter 204.

The converter 304 includes a first output 322a coupled to the first input 224a of the de-coupler circuit 206 and a second output 322b coupled to the second input 224b of the de-coupler circuit 206. In one example, the converter 304 includes a first inductor 314, a first converter switch 316a, a second converter switch 316b, a first diode 318a, a second diode 318b, and a first capacitor 320. In one embodiment, the first and second converter switches 316a, 316b may be IGBTs; however, in other embodiments, different types of switches or transistors can be utilized. As shown, a first end of the first inductor 314 is coupled to the input 312 of the converter 304 and a second end of the first inductor 314 is coupled to the emitter of the first converter switch 316a and the collector of the second converter switch 316b. The collector of the first converter switch 316a is coupled to the first diode 318a and a first end of the first capacitor 320. Likewise, the emitter of the second converter switch 316b is coupled to the second diode 318b and a second end of the first capacitor 320. The first end of the first capacitor 320 is coupled to the first output 322a of the converter 304 and the second end of the first capacitor 320 is coupled to the second output 322b of the converter 304. The converter 304 is coupled to the neutral connection 244 between the first and second diodes 318a, 318b.

In one example, the UPS topology 300 can be operated in various modes of operation similar to the UPS topology 200. For example, in the synchronous mode of operation, the first and second de-coupler switches 226a, 226b are turned on (i.e., closed) to couple the first and second inputs 232a, 232b of the inverter 208 to the first and second outputs 322a, 322b of the converter 304. In the synchronous mode of operation, the converter 304 is operated to convert input AC power provided by the AC source 202 into DC power. The de-coupler circuit 206 functions as a single DC bus and the first and second capacitors 320, 234 function as DC bus capacitors to store the DC power provided by the converter 304. The inverter 208 is operated to convert the DC power into output AC power having the same voltage level and frequency as the input power provided by the AC source 202.

In the asynchronous mode of operation, the first and second de-coupler switches 226a, 226b may be controlled in unison with at least one of the first and second converter switches 316a, 316b such that at least one of the voltage level and/or frequency of the output AC power differs from the input AC power provided by the AC source 202. For example, during a positive half cycle of the input AC power, the de-coupler switches 226a, 226b may be controlled in unison with the second converter switch 316b. Likewise, during a negative half cycle of the input AC power, the de-coupler switches 226a, 226b may be controlled in unison with the first converter switch 316a.

Figure 3B:
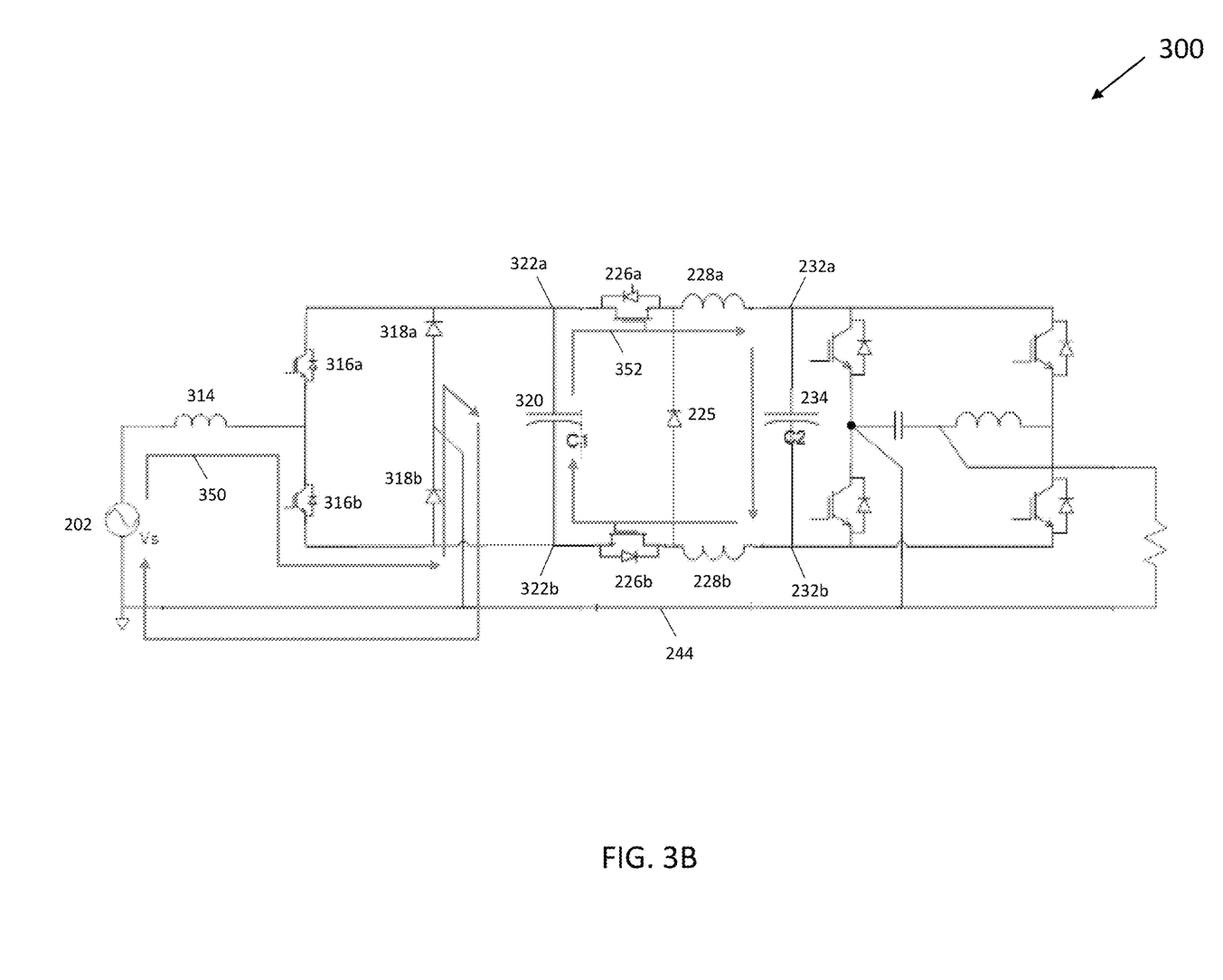
FIG. 3B is a schematic diagram of a UPS topology in accordance with one embodiment described herein.
Figure 3C:
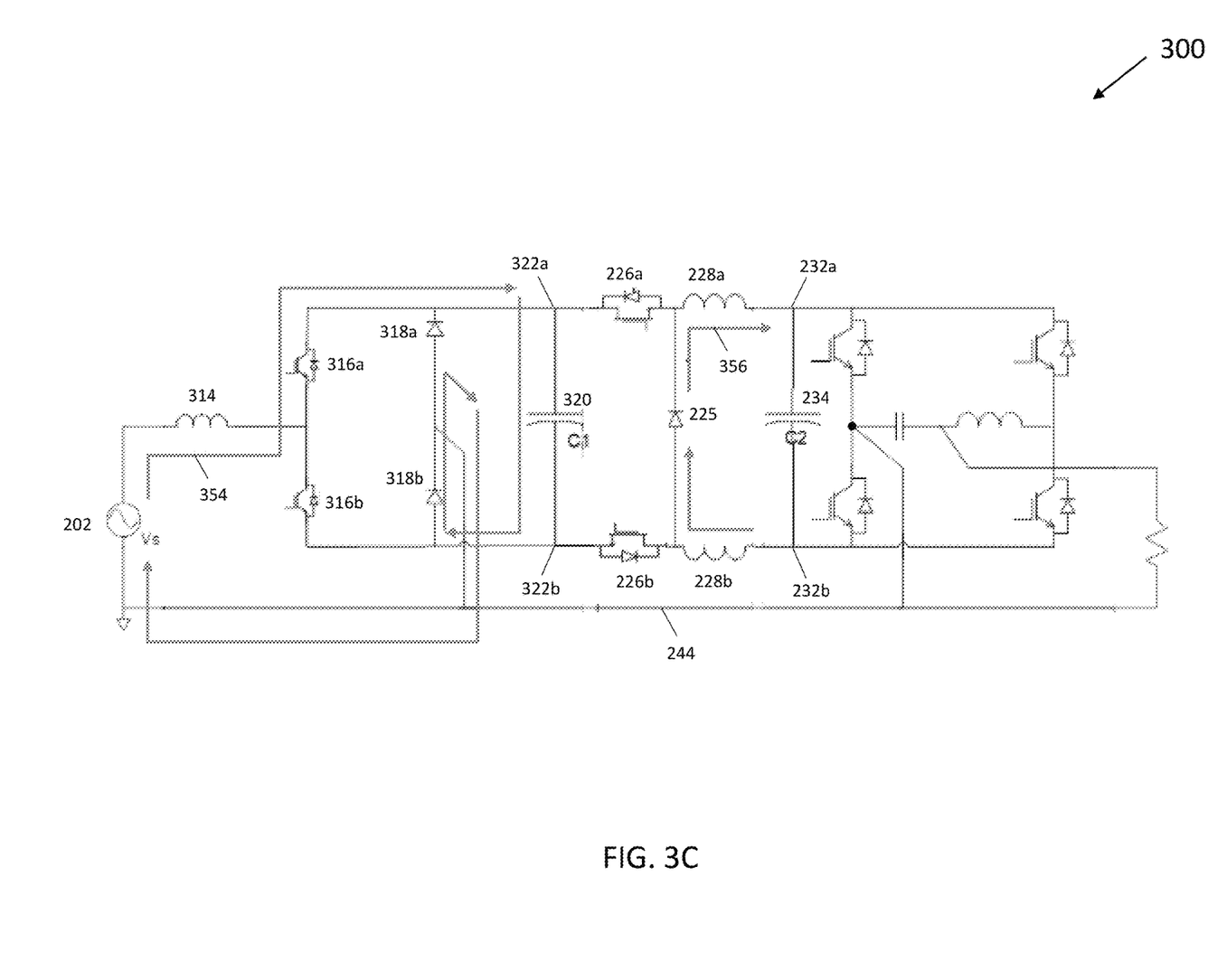
FIG. 3C is a schematic diagram of a UPS topology in accordance with one embodiment described herein.

FIGS. 3B and 3C are schematic diagrams illustrating the asynchronous mode of operation during a positive half cycle of the input AC voltage corresponding to the input AC power.

As shown in FIG. 3B, during the first state of the asynchronous mode of operation, the first converter switch 316a is turned off (i.e., opened) and the second converter switch 316b is turned on (i.e., closed) to couple the second end of the first inductor 314 to the neutral connection 244. As such, a first conduction path 350 for the input AC power is provided through the second converter switch 316b and the second diode 318b to the neutral connection 244, energizing the first inductor 314. Simultaneously, the first and second de-coupler switches 226a, 226b are turned on (i.e., closed) to couple the first and second inputs 232a, 232b of the inverter 208 to the first and second outputs 322a, 322b of the converter 304. As such, the first capacitor 320 discharges via a second conduction path 352 including the second and third inductors 228a, 228b to charge the second capacitor 234 and to provide DC power to the inverter 208.

In the second state of the asynchronous mode of operation, the first converter switch 316a is turned on (i.e., closed) and the second converter switch 316b is turned off (i.e., opened) to de-couple the first inductor 314 from the neutral connection 244. As shown in FIG. 3C, when the first converter switch 316a is turned on and the second converter switch 316b is turned off, a third conduction path 354 is provided from the first inductor 314 through the first converter switch 316a, the first capacitor 320, and the second diode 318b to the neutral connection 244. In one example, the first inductor 314 is de-energized to charge the first capacitor 320 via the third conduction path 354. Simultaneously, the first and second de-coupler switches 226a, 226b are turned off (i.e., opened) to de-couple the first and second inputs 232a, 232b of the inverter 208 from the first and second outputs 322a, 322b of the converter 304. As such, the second capacitor 234 discharges via a fourth conduction path 356 through the freewheeling diode 225 and the third and fourth inductors 228a, 228b to provide DC power to the inverter 208.

While not shown, in the asynchronous mode of operation, the UPS topology 300 can be configured to operate similarly during a negative half cycle of the input AC power. For example, when the switches 316a, 226a, and 226b are turned on (i.e., closed), the first inductor 314 is energized via a conduction path including the first switch 316a and the first diode 318a, and the first capacitor 320 discharges (e.g., via the second conduction path 352) to charge the second capacitor 234 and to provide DC power to the inverter 208. Likewise, when the switches 316a, 226a, and 226b are turned off (i.e., opened), the second switch 316b may be turned on (i.e., closed) such that the first inductor 314 de-energizes to charge the first capacitor 220 via a conduction path including the second switch 316b and the first diode 318a, and the second capacitor 234 discharges (e.g., via the fourth conduction path 356) to provide DC power to the inverter 208.

Being that the first and second de-coupler switches 226a, 226b are controlled in unison with at least one of the first and second converter switches 316a, 316b, the inverter 208 may be isolated from the AC source 202 and the operation of the converter 304. For example, during a positive half cycle of the input AC power, when the switches 316b, 226a, and 226b are turned on (i.e., closed), the AC source 202 is effectively shorted to neutral (i.e., ground) through the first inductor 314 and the inverter 208 is operated to convert DC power provided from the first capacitor 320. Likewise, when the switches 316b, 226a, and 226b are turned off (i.e., opened), the inverter 208 is de-coupled from the converter 304 and is operated to convert DC power provided by the second capacitor 234. As such, the inverter 208 may be operated independently relative to operation of the converter 304 to provide output AC power having a voltage level and/or frequency which differs from the input AC power provided by the AC source 202.

In some examples, the UPS topologies described herein (e.g., 200, 300) can be configured to operate in a mixed mode of operation. In one example, the UPS topologies 200, 300 are operated in the mixed mode of operation by alternating between the synchronous and asynchronous modes of operation.

Figure 4:
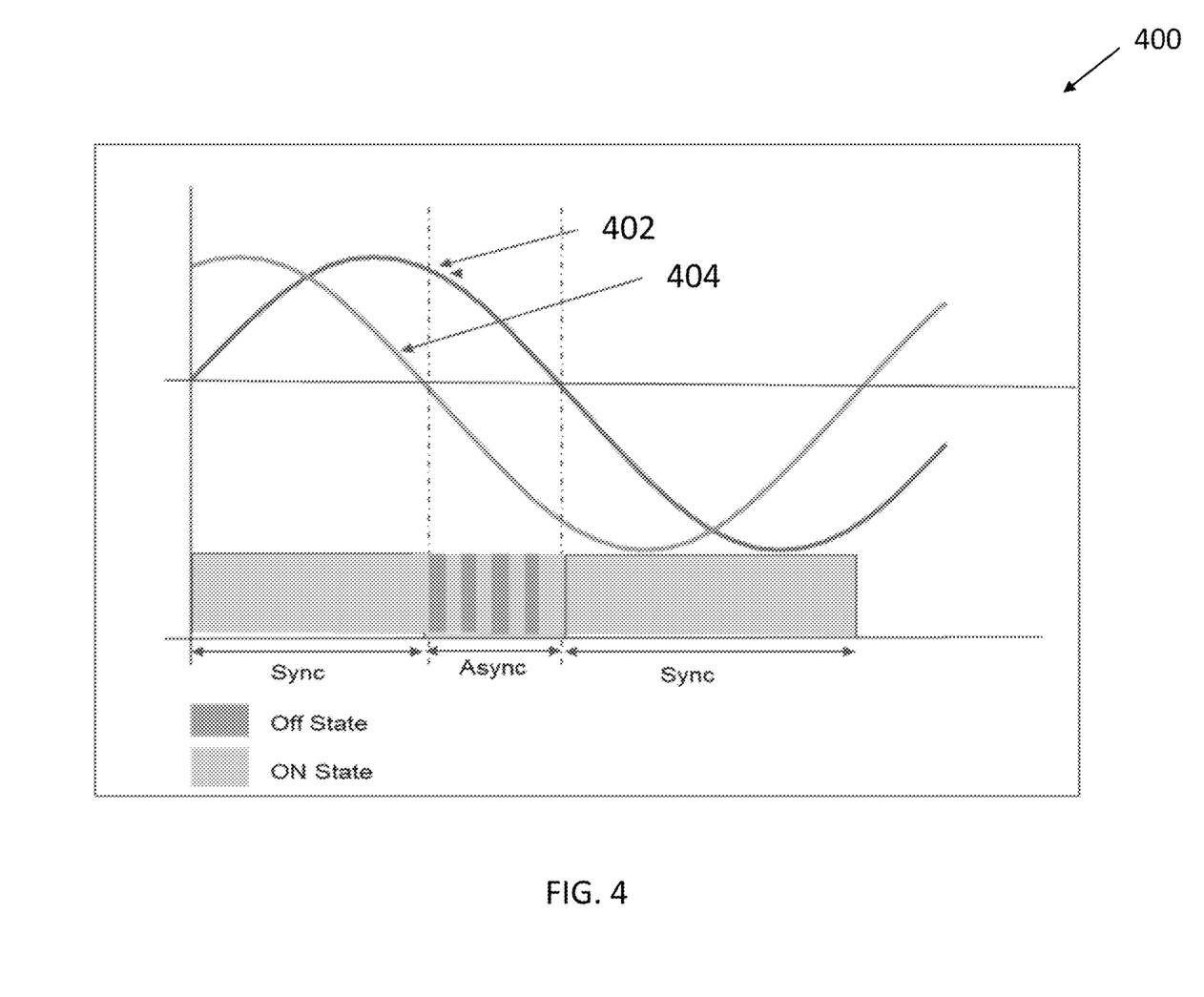
FIG. 4 is a diagram of a control scheme for a UPS topology in accordance with one embodiment described herein.

FIG. 4 is a diagram 400 illustrating a control scheme for the mixed mode of operation according to aspects described herein. In one example, an input AC voltage 402 corresponds to input AC power provided by the AC source 202 and an output AC voltage 404 corresponds to output AC power provided by the inverter 208. As shown, the UPS topologies 200, 300 are operated in the synchronous ("sync") mode of operation when the input AC voltage 402 and the output AC voltage 404 have the same polarity. For example, when the input and output AC voltages 402, 404 are both positive or negative, the UPS topology is operated in the synchronous mode of operation. Likewise, when the input AC voltage 402 and the output voltage 404 have different polarities, the UPS topologies 200, 300 are operated in the asynchronous ("async") mode of operation. For example, when one of the input or output AC voltages 402, 404 is positive and the other is negative, the UPS topology is operated in the asynchronous mode of operation.

The mixed mode of operation can be used to provide output AC power having the same voltage level and frequency as the input power provided by the AC source 202. In some examples, by alternating between the synchronous and asynchronous modes of operation, power loss associated with the de-coupler switches 226a, 226b can be minimized. For example, being that the de-coupler switches 226a, 226b are turned off (i.e., opened) during at least a portion of the asynchronous mode of operation (e.g., the second state), the total power loss associated with the de-coupler switches 226a, 226b can be reduced. As such, the efficiency of the UPS topologies 200, 300 may be improved when operating to provide output AC power having the same voltage level and frequency as the input power. In addition, ripple current (s) associated with the output AC power may be minimized when operating in the mixed mode of operation. In addition, being that the UPS topologies 200, 300 include a single DC bus configuration, the voltage rating of the inverter switches 236a-236d may be reduced (e.g., by 50%), further improving efficiency during all modes of operation.

In at least one embodiment, the UPS topologies described herein (e.g., 200, 300) are operated by a controller (e.g., controller 114 of FIG. 1). For example, the controller 114 may provide pulse width modulated (PWM) signals to the switches included in the converter 204 or 304 and the inverter 208 for controlling the power conversion functions. Likewise, the controller 114 may provide control signals to the switches included in the de-coupler circuit 206. In one example, the control signals provided to the de-coupler switches may be derived from the PWM used to operate the converters (e.g., 204, 304). In some examples, the controller 114 may be configured to monitor the input AC power and/or the output AC power. For example, the controller 114 may monitor the input and output AC power to determine when to alternate between the synchronous/asynchronous modes during the mixed mode of operation. In other examples, the controller 114 may determine when to alternate between the synchronous/asynchronous modes during the mixed mode of operation based on another parameter (e.g., a known delay between the input and output). The controller can include hardware, software, firmware, a processor, a memory, an input/output interface, a data bus, and/or other elements in any combination that may be used to perform the respective functions of the controller.

As described above, a more efficient and compact online UPS topology is provided herein. In at least one embodiment, the topology includes a de-coupler circuit coupled between the converter and the inverter in a single DC bus configuration. In one example, by operating the de-coupler circuit to selectively de-couple the inverter from the converter, the inverter can efficiently provide output AC power having the same voltage level and frequency as the input AC power and output AC power having a voltage level and/or frequency independent of the input AC power.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of this invention. Accordingly, the foregoing description and drawings are by way of example only.

What is claimed is:

1. An Uninterruptible Power Supply (UPS) system, the UPS system comprising:
    an input configured to receive input AC power having an input voltage level and an input frequency;
    an output configured to provide output AC power to a load, the output power having an output voltage level and an output frequency;
    a converter coupled to the input and configured to convert the input AC power into DC power;
    an inverter coupled to the output and configured to convert the DC power into the output AC power and provide the output AC power to the output;
    a DC bus coupled between the converter and the inverter including a first capacitive element and a second capacitive element, the first capacitive element being coupled to a first output and a second output of the converter and the second capacitive element being coupled to a first input and a second input of the inverter;
    a de-coupler circuit coupled between the first and second capacitive elements and configured to selectively decouple the inverter from the converter; and
    a controller configured to operate the converter, the inverter, and the de-coupler circuit in a first mode of operation such that the output voltage level and output frequency of the output AC power are the same as the input voltage level and input frequency of the input AC power and a second mode of operation such that at least one of the output voltage level or output frequency of the output AC power differs from the input voltage level and input frequency of the input AC power.

2. The UPS system of claim 1, wherein the controller is further configured to operate the UPS system in the first mode of operation by controlling the de-coupler circuit to couple the inverter to the converter.

3. The UPS system of claim 1, wherein the controller is further configured to operate the UPS system in the second mode of operation by controlling the de-coupler circuit to selectively decouple the inverter from the converter based on an operational state of the converter.

4. The UPS system of claim 1, wherein the controller is further configured to operate the UPS system in a third mode of operation by alternating the UPS system between the first and second modes of operation.

5. The UPS system of claim 4, wherein the controller is configured, during the third mode of operation, to operate the UPS system in the first mode of operation in response to a determination that an input voltage of the input AC power and an output voltage of the output AC power are both positive or both negative.

6. The UPS system of claim 5, wherein the controller is configured, during the third mode of operation, to operate the UPS system in the second mode of operation in response to a determination that one of the input voltage or the output voltage is positive and the other is negative.

7. The UPS system of claim 6, wherein the output voltage level and output frequency are independently controllable with respect to the input voltage level and input frequency during the third mode of operation.

8. The UPS system of claim 7, wherein the converter includes a first converter switch, a second converter switch, and a first inductive element, the first inductive element being coupled at a first end to the input.

9. The UPS system of claim 8, wherein the first inductive element is coupled at a second end to the first converter switch and the second converter switch is coupled in series with the first converter switch.

10. The UPS system of claim 8, wherein the first inductive element is coupled at a second end to the first converter switch and the second converter switch.

11. The UPS system of claim 8, wherein the controller is configured to operate the converter in a first state by controlling the first and second switches to energize the first inductive element.

12. The UPS system of claim 11, wherein the controller is configured to operate the converter in a second state by controlling the first and second converter switches to de-energize the first inductive element to charge the first capacitive element.

13. The UPS system of claim 12, wherein the de-coupler circuit includes a first de-coupler switch coupled at a first end to the first output of the converter, a second de-coupler switch coupled at a first end to the second output of the converter, a second inductive element coupled between the first input of the inverter and a second end of the first de-coupler switch, and a third inductive element coupled between the second input of the inverter and a second end of the second de-coupler switch.

14. The UPS system of claim 13, wherein the controller is configured to control the first and second de-coupler switches to couple the inputs of the inverter to the outputs of the converter during the first mode of operation.

15. The UPS system of claim 13, wherein the controller is configured to control the first and second de-coupler switches to couple the inputs of the inverter to the outputs of the converter while operating the converter in the first state during the second mode of operation.

16. The UPS system of claim 15, wherein the first capacitive element is discharged to charge the second capacitive element while the controller is operating the converter in the first state during the second mode of operation.

17. The UPS system of claim 13, wherein the controller is configured to control the first and second de-coupler switches to decouple the inputs of the inverter from the outputs of the converter while operating the converter in the second state during the second mode of operation.

18. The UPS system of claim 17, wherein the second capacitive element is discharged to provide DC power to the inverter while the controller is operating the converter in the second state during the second mode of operation.

19. The UPS system of claim 1, wherein the input, the converter, the inverter, and the output are coupled to a common neutral line.

20. A non-transitory computer readable medium storing thereon sequences of computer-executable instructions for operating an Uninterruptible Power Supply (UPS) system, the sequences of computer-executable instructions including instructions that instruct at least one processor to operate the UPS system to:
  receive input AC power having an input voltage level and an input frequency at an input of the UPS system;
  operate a converter to convert the input AC power into DC power;
  operate an inverter to convert the DC power into output AC power and provide the output AC power to an output of the UPS system, the output AC power having an output voltage level and an output frequency;
  couple, via a de-coupler circuit, the inverter to the converter during a first mode of operation such that the output voltage level and output frequency of the output AC power are the same as the input voltage level and input frequency of the input AC power; and
  selectively de-couple, via the de-coupler circuit, the inverter from the converter during a second mode of operation such that at least one of the output voltage level or output frequency of the output AC power differs from the input voltage level and input frequency of the input AC power.

21. The non-transitory computer readable medium according to claim 20, wherein the sequences of instructions include instructions that cause the at least one processor to operate the UPS to:
  operate the converter by alternating the converter between a first state and a second state to convert the input AC power into DC power.

22. The non-transitory computer readable medium according to claim 21, wherein the sequences of instructions include instructions that cause the at least one processor to operate the UPS system to:
  operate the converter to energize an inductive element coupled to the input of the converter during the first state and de-energize the inductive element to charge a first capacitive element coupled to a first and second output of the converter during the second state.

23. The non-transitory computer readable medium according to claim 22, wherein the sequences of instructions include instructions that cause the at least one processor to operate the UPS system to:
  operate the converter in the first state to discharge the first capacitive element to charge a second capacitive element coupled to a first and second input of the inverter during the second mode of operation.

24. The non-transitory computer readable medium according to claim 23, wherein the sequences of instructions include instructions that cause the at least one processor to operate the UPS system to:
  operate the converter in the second state to discharge the second capacitive element to provide DC power to the inverter during the second mode of operation.

25. The non-transitory computer readable medium according to claim 24, wherein the sequences of instructions include instructions that cause the at least one processor to operate the UPS system to:
  selectively de-couple the inverter from the converter during the second mode of operation while the converter is operating in the second state.

26. The non-transitory computer readable medium according to claim 25, wherein the sequences of instructions include instructions that cause the at least one processor to operate the UPS system to:
  operate the UPS system in a third mode of operation by operating the UPS system in the first mode of operation in response to a determination that an input voltage of the input AC power and an output voltage of the output AC power are both positive or both negative and in the second mode of operation in response to a determination that one of the input voltage or the output voltage is positive and the other is negative.

27. The non-transitory computer readable medium according to claim 25, wherein the output voltage level and output frequency of the output AC power are independently controllable with respect to the input voltage level and input frequency of the input AC power during the third mode of operation.

28. A method for operating an Uninterruptible Power Supply (UPS) system, the method comprising:
  receiving input AC power having an input voltage level and an input frequency at an input of the UPS system;
  operating the converter to convert the input AC power into DC power;
  operating the inverter to convert the DC power into output AC power and provide the output AC power to an output of the UPS system, the output AC power having an output voltage level and an output frequency;
  coupling, via a de-coupler circuit, the inverter to the converter during a first mode of operation such that the output voltage level and output frequency of the output AC power are the same as the input voltage level and input frequency of the input AC power; and
  selectively de-coupling, via the de-coupler circuit, the inverter from the converter during a second mode of operation such that at least one of the output voltage level or output frequency of the output AC power differs from the input voltage level and input frequency of the input AC power.

* * * * *